May 8, 1956 W. A. RAY 2,744,947
RADIATION THERMOCOUPLE
Filed April 5, 1954

INVENTOR.
WILLIAM A. RAY
BY
John H. Rouse,
ATTORNEY.

United States Patent Office 2,744,947
Patented May 8, 1956

2,744,947
RADIATION THERMOCOUPLE

William A. Ray, North Hollywood, Calif., assignor to General Controls Co., Glendale, Calif., a corporation of California Application April 5, 1954, Serial No. 420,932

12 Claims. (Cl. 136—4)

This invention relates to thermoelectric generating devices of the type adapted to be influenced by thermal radiation; a general object of the invention being to provide a thermocouple whose response to variation of the intensity of the radiation is rapid and whose electrical resistance, notwithstanding, is relatively low.

The present invention is similar in principle to that disclosed in my copending application Serial No. 247,811, filed September 22, 1951, now Patent No. 2,677,711, and is in some respects an improvement thereon.

The radiation thermocouple of this invention, while obviously capable of other uses, has particular utility for sensing the combustion of an oil-burner; the electricity generated by the thermocouple being then employed, for example, to "saturate" a reactor in a magnetic amplifier for controlling the operation of the burner, or for direct energization of a sensitive relay.

The E. M. F. of a thermocouple under these circumstances is small, and it is therefore essential that the electrical resistance of the thermocouple be low to avoid excessive loss of power. But it is also essential, to avoid sluggish response of the thermocouple, that its mass and thermal capacity be small.

For full understanding of how, by this invention, the foregoing requirements are met, reference is to be had to the following detailed description and accompanying drawing, wherein.

Figure 1:
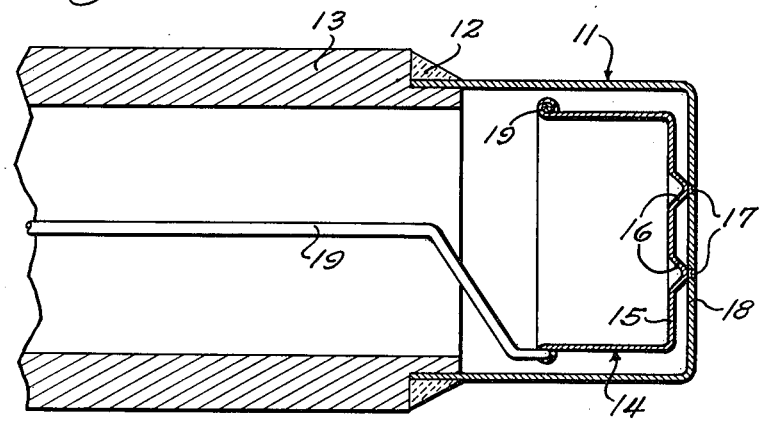
Figure 1 is a sectional view of a thermocouple structure embodying this invention.
Figure 2:
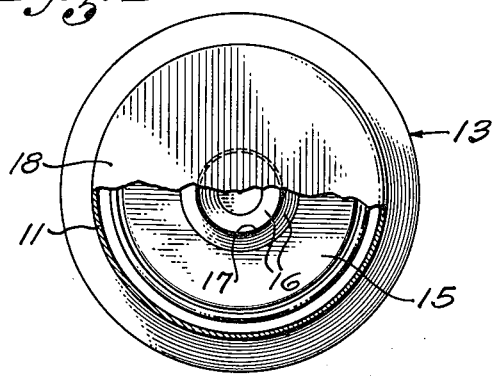
Figure 2 is a front elevation, with the outer wall 18 partly broken away, of the structure shown in Fig. 1.

Referring first more particularly to Figs. 1 and 2, the numeral 11 indicates a cup-shaped metallic member whose open end is secured, by welding as indicated at 12, to an end of a metallic tube 13 which forms one terminal of the thermocouple. Inside the member 11 is another cup-shaped member 14 whose end wall 15 is indented to provide a circular V-shaped ridge 16 which is secured at its apex, by welding as indicated at 17, to the adjacent end wall 18 of the outer cup-shaped member 11. The open end of the inner cup-shaped member is rolled around and soldered to a wire 19 which forms the other terminal of the thermocouple.

The left end of the structure (not shown) may be of any form suitable for mounting the same so that its end wall 18 faces the source of thermal radiation to which the thermocouple is to respond (such as the luminous flame of an oil-burner), and for electrically connecting the thermocouple in a control circuit.

The cup-shaped members 11 and 14 may be of any suitable thermoelectrically dissimilar materials. In a practical embodiment of the invention, substantially as shown in Figs. 1 and 2 but of greatly reduced dimensions, the member 11 (and tube 13) are of a steel alloy containing about 27% chromium, and the member 14 of an alloy containing about 55% copper and 45% nickel.

Both of the members are of very thin material. In said practical embodiment the thickness of the material of the outer member 11 is 0.005 inch, and that of the inner member 14 about 0.003 inch. The end wall 18 of the outer member absorbs thermal radiation from the source toward which it is faced and converts the radiation into heat which influences the circular "hot" junction 17 between the members so that electricity is generated. The face of wall 18 is preferably coated with some inert black substance to increase the absorption of heat. The diameter of junction 17 is about 0.2 inch in the aforementioned embodiment. The "cold junction" of the thermocouple is effectively at the points where the terminals 13 and 19 are connected to the control circuit or load, provided that wire 19 is of the same material as that of member 14. In practice, wire 19 is preferably of copper because of its low resistivity, and since the temperature difference throughout the length of this wire is normally small.

The essential elements of the thermocouple shown in Figs. 1 and 2 are the end wall 18 and the means (ridge 16), of thermoelectrically dissimilar metal, in linear engagement with this wall. The side wall of member 11 serves normally only as a low-resistance path for the generated current, and as convenient means for supporting the end wall.

Inasmuch as the essential part of member 11 is the part exposed to thermal radiation (normally, only the end wall 18), this part is recited in some of the appended claims as a "sheet" of thin metal.

The end wall 18 serves not only to collect the thermal radiation but also to screen from the radiation the inner member 14 (whose temperature determines the cold-junction temperature of the thermocouple) so that it remains relatively cool in operation.

The linear hot-junction area 17 is made small so that the temperature, as well as the effective thermal capacity, of the end wall 18 is not materally affected by conduction of heat to the inner member 14 through the hot junction and the projection or ridge 16. However, the hot-junction area should be of appreciable width, rather than a mere line, to avoid excessive resistance at the hot junction to the flow of generated current, whose E. M. F. is of the order of but a few millivolts when the aforementioned alloys are employed.

By making member 11 of the extreme thinness mentioned above (of the order of 0.005") the mass and thermal capacity of its end wall 18 are correspondingly small, and the response of the thermocouple to establishment and cessation of thermal radiation rapid; responsive operation of typical controlling apparatus then occurring in about ten seconds. Since member 14 also is of thin metal, and wire 19 is connected at the innermost end of the side wall of this member, the effective thermal capacity of wall 18 is increased only slightly by its engagement with member 14.

The linear hot junction 17 obviously could be of a shape other than circular as shown. Further, there could be a plurality of linear areas, provided that the thermal capacity of the radiation-absorbing wall 18 is not materially increased.

By making the ridge 16 V-shaped in cross-section the electric welding operation is facilitated since the member 14 can then be supported on a thin tubular electrode fitting the root of the groove formed by the indention.

Figure 3:
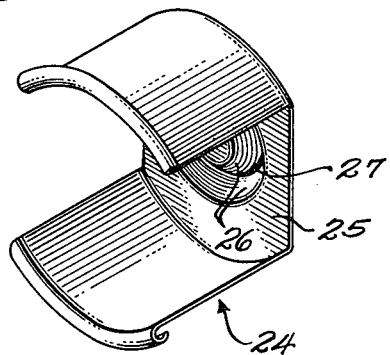
Figure 3 is a perspective view of a modified form of the inner cup-shaped member 14 of Figs. 1 and 2.

The modified form of inner thermocouple member shown in Fig. 3 is the same as member 14 of Figs. 1 and 2 except that the modified member is formed from a strip of metal too narrow for the production of a whole cup. A cup-drawing operation is thus avoided, which operation is difficult to perform with sheet metal of the alloy and thinness (0.003") employed. The increase of electrical resistance of the modified member because of its reduced area is not such as to materially reduce the flow of generated current. The numerals assigned to the various parts of the modified member of Fig. 3 are greater by ten than the numerals of the corresponding parts in Figs. 1 and 2.

Figure 4:
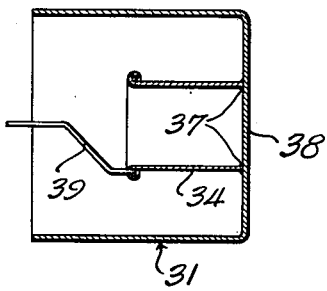
Figure 4 is a sectional view of a modified thermocouple structure according to this invention.

The modified form of radiation thermocouple shown in Fig. 4 comprises a cup-shaped outer member 31 having an end wall 38 to the inner surface of which a cylindrical tubular member 34 (having a terminal 39) is welded to form a circular hot junction 37. The members 31 and 34 may be of the same sheet metals as those of which the members 11 and 14 of Figs. 1 and 2 are made.

Further modifications in accordance with this invention will be apparent to those skilled in the art, and I intend therefore to be limited only by the scope of the appended claims.

I claim as my invention:

1. A thermoelectric generating device consisting of a thin sheet adapted to be faced toward a source of thermal radiation; and means at the back of said sheet, of material thermoelectrically dissimilar to that of the sheet, in linear engagement with the sheet and forming at the line of engagement the thermoelectric hot-junction of the device.

2. A thermoelectric generating device consisting of a thin metallic sheet adapted to be faced toward a source of thermal radiation to absorb the same and thereby convert it into heat; and means at the back of said sheet, of metal thermoelectrically dissimilar to that of the sheet, in linear engagement with the sheet and forming at the line of engagement the thermoelectric hot-junction of the device, the mass and arrangement of said last-named means being such that the effective thermal capacity of said sheet is not substantially increased.

3. A thermoelectric generating device consisting of a thin metallic sheet adapted to be faced toward a source of thermal radiation; and means at the back of said sheet and screened thereby from said radiation, of metal thermoelectrically dissimilar to that of the sheet, in linear engagement with the sheet and forming at the line of engagement the thermoelectric hot-junction of the device, the mass and arrangement of said last-named means being such that the effective thermal capacity of said sheet is not substantially increased.

4. A thermoelectric generating device consisting of a first sheet of thin metal adapted to be faced toward a source of thermal radiation; a second sheet of thin metal at the back of said first sheet and screened thereby from said radiation; and means, of metal thermoelectrically dissimilar to that of said first sheet, providing a linear electrical connection between the sheets and forming with the first sheet the thermoelectric hot-junction of the device.

5. A thermoelectric generating device according to claim 4 and wherein said electrical connection is in the form of a substantially continuous line.

6. A thermoelectric generating device consisting of a pair of thin sheets of thermoelectrically dissimilar metals; one of said sheets being adapted to be faced toward a source of thermal radiation; the other of said sheets being at the back of said one of the sheets and in generally-parallel spaced relation thereto; said other of the sheets being somewhat smaller than said one of the sheets and so that it is screened thereby from said radiation; said other of said sheets being deformed to provide a ridge engaging said one of the sheets and forming therewith a substantially linear hot-junction.

7. A thermoelectric generating device according to claim 6 and wherein said ridge is substantially continuous.

8. A thermoelectric generating device consisting of a pair of thin sheets of thermoelectrically dissimilar metals; one of said sheets being adapted to be faced toward a source of thermal radiation; the other of said sheets being at the back of said one of the sheets and in generally-parallel spaced relation thereto; said other of the sheets being somewhat smaller than said one of the sheets and so that it is screened thereby from said radiation; said other of said sheets having an elongated indention forming a hollow projection engaging said one of the sheets and secured to form therewith a substantially linear thermoelectric hot-junction.

9. A thermoelectric generating device according to claim 8 and wherein said indention is V-shaped in cross-section.

10. A thermoelectric generating device according to claim 8 and wherein said indention is substantially continuous.

11. A thermoelectric generating device consisting of a pair of cup-shaped members of thin metal having dissimilar thermoelectric properties; one of the members being somewhat smaller than the other and spacedly disposed therein with its end wall adjacent and generally parallel to the end wall of the other and larger of the members; the end wall of said one of the members having an elongated indention forming a hollow projection engaging the end wall of the other of the members and secured to form therewith a substantially linear hot-junction; the outer surface of the larger of the members being adapted to be faced toward a source of thermal radiation.

12. A thermoelectric generating device according to claim 11 and wherein said indention is substantially continuous.

References Cited in the file of this patent

UNITED STATES PATENTS

| 2,526,491 | Liston et al. | Oct. 17, 1950 |
| 2,677,711 | Ray | May 4, 1954 |